Patented Jan. 19, 1954

2,666,728

UNITED STATES PATENT OFFICE 2,666,728

PREPARATION FOR MANGE AND FUNGUS ECZEMA

Clifford R. Smith, Chamblee, Ga.

No Drawing. Application February 27, 1951,
Serial No. 213,043

2 Claims. (Cl. 167—53.2)

This invention relates to a medicinal preparation useful for the treatment and prevention of certain animal skin conditions and, more particularly, relates to such a preparation which is useful for the treatment and prevention of sarcoptic and demodectic mange and fungus eczema. The preparation in accordance with this invention has added utility in that it also destroys fleas, lice and mites, and is an effective tick repellent.

It is, therefore, an object of this invention to provide a medicinal preparation useful for the treatment of certain animal skin conditions.

It is a further object of this invention to provide a medicinal preparation suitable for the treatment and prevention of sarcoptic and demodectic mange and fungus eczema.

It is an additional object of this invention to provide a medicinal preparation for use on animals to destroy fleas, lice and mites, and to repel ticks.

Generally speaking, the preparation in accordance with this invention comprises a terpene thio-cyano acetate ester, a quaternary ammonium compound, a polyethylene oxide ether and inert material which acts as a carrier.

The terpene thio-cyano acetate ester will preferably be about 5% by weight of the preparation but may be within the range of about 1% to about 10% by weight of the preparation. The quaternary ammonium compound will preferably be about 0.6% by weight of the preparation but may be within the range of 0.05% to 1.0% by weight of the preparation. The polyethylene oxide ether will desirably be about 0.5% by weight of the preparation but may be within the range of 0.1% to 5.0% of the preparation. The inert ingredient will fill the remaining percentage of the preparation.

The terpene thio-cyano acetate esters may be, for example, isobornyl thiocyano acetate, bornyl thiocyano acetate, camphene thiocyano acetate, thio rhodanates.

The quaternary ammonium compound may be, for example, analkenyl dimethyl benzyl ammonium chloride, such as alkenyl $C_{16}$–$C_{20}$ dimethyl ethyl ammonium bromide, an alkyl dimethyl benzyl ammonium chloride, such as ethyl dimethyl benzyl ammonium chloride or propyl dimethyl benzyl ammonium chloride. As further exemplary of these compounds are lauryl isoquinolinium bromide, dimethyl benzyl dodecyl ammonium chloride or bromide, dimethyl benzyl p-tertiary octylphenoxyethoxyethyl ammonium chloride or bromide, cetyl trimethyl ammonium chloride or bromide, dimethyl ethyl 9-octadecenyl ammonium bromide, 3,4-dichlorobenzyl dimethyl dodecyl ammonium chloride, cetyl pyridium bromide, and the like.

The polyethylene oxide ethers may be, for example, nonionic aromatic polyglycol ethers, such as polyethylene oxide ethers of nonyl phenol, or polyethylene oxide ethers of isooctyl phenol. As further exemplary of polyethylene oxide esters which have been found to be satisfactory are polyethylene oxide derivatives of 20 to 40 mol equivalents of ethylene oxide.

The inert ingredient may be, for example, gelatin, sodium carboxymethyl cellulose, mineral oil, deodorized kerosene, water, gum tragacanth, gum karaya or other vegetable gums. The inert ingredient acts as a carrier and, it will be appreciated, can be any suitable carrier which does not destroy the chemical properties of the other ingredients in the preparation.

The composition according to this invention may be conveniently prepared by adding the terpene thiocyano acetate esters to the quaternary ammonium compounds and then adding the polyethylene oxide ethers. The kerosene and mineral oil is added to this mixture. The gelatin or sodium carboxymethyl cellulose is added to the water. The aqueous and non-aqueous solutions are united by stirring. The emulsion results.

The following examples are illustrative of specific compositions in accordance with this invention and of the procedure of their preparation.

*Example 1*

To isobornyl thiocyano acetate in the amount of 5% by volume was added 0.6% by volume of ethyl dimethyl benzyl ammonium chloride and 0.5% by volume of polyethylene oxide ethers of nonyl phenol. To this mixture 2.0% by volume of mineral oil was added. In a separate container, 0.6% by volume of gelatin was mixed with 91.3% by volume of water. The aqueous and non-aqueous solutions were then mixed, with agitation. An emulsion resulted from the final mixing step.

*For use as prophylaxis.*—One part of the emulsion, prepared as indicated above, was diluted with 3 parts of water and a dog was saturated with the mixture twice a month. This treatment was effective for the prevention of mange, fungus, and skin conditions of obscure external origin, when the dog was exposed to other dogs affected with the above conditions.

*Example 2*

*For treatment of demodectic mange.*—1 part of the emulsion of Example 1 was diluted with 3 parts water and applied daily to a dog for treatment of demodectic mange. The preparation was rubbed into the skin. After 10 applications, the mange had completely disappeared.

*Example 3*

For treatment of sarcoptic mange.—1 part of the emulsion of Example 1 was diluted with 3 parts water and applied daily to a dog for the treatment of sarcoptic mange. The preparation was rubbed into the skin. After 5 applications, the mange had completely disappeared.

*Example 4*

For treatment of "Summer" or fungus eczema.—1 part of the emulsion of Example 1 was diluted with 3 parts water and applied daily to a dog for the treatment of "Summer" or fungus eczema. The preparation was rubbed into the skin. After 5 applications, the eczema had completely disappeared.

*Example 5*

For treatment of ringworm.—1 part of the emulsion of Example 1 was diluted with 3 parts water and applied daily to a dog for the treatment of ringworm. The preparation was rubbed into the skin. After 5 applications, the ringworm had completely disappeared.

*Example 6*

For treatment of skin conditions of obscure external origin.—The condition could not be diagnosed after repeated skin scrapings. 1 part of the emulsion of Example 1 was diluted with 3 parts of water and applied daily to a dog for treatment of the above condition. The preparation was rubbed into the skin. After 5 applications, the condition had completely disappeared.

*Example 7*

For defleaing.—1 part of the emulsion of Example 1 was diluted with 3 parts of water and applied to a dog. In four minutes, a 100% kill of fleas was observed.

*Example 8*

1 part of the emulsion of Example 1 was diluted with 3 parts of water and applied daily to two dogs, one for defleaing and one for treatment of demodectic mange. After use of the preparation, it was observed that ticks were effectively repelled thereby.

What is claimed is:

1. A medicinal preparation for the treatment of sarcoptic and demodectic mange and fungus eczema which comprises a member selected from the group consisting of bornyl thiocyano acetate, isobornyl thiocyano acetate and camphene thiocyano acetate, a lower alkyl dimethyl benzyl ammonium chloride, a polyethylene oxide ether of nonyl phenol and an inert carrier.

2. A medicinal preparation for the treatment of sarcoptic and demodectic mange and fungus eczema which comprises isobornyl thiocyano acetate, a lower alkyl dimethyl benzyl ammonium chloride, a polyethylene oxide ether of nonyl phenol and an inert carrier.

CLIFFORD R. SMITH.

References Cited in the file of this patent

UNITED STATES PATENTS

| Number | Name | Date |
|---|---|---|
| 2,436,184 | Stillman | Feb. 17, 1948 |

FOREIGN PATENTS

| Number | Country | Date |
|---|---|---|
| 731,718 | Germany | Feb. 16, 1943 |

OTHER REFERENCES

New and Nonofficial Remedies (1950), pages 103, 104.

Jones, Journal of Economic Entomology, vol. 39, Dec. 1946, pages 736 to 740.

Reid, Annals of Surgery, Oct. 1943, pages 741 to 744.

Kerr, Chemical Abstracts, vol. 41, page 2845 (1947).

Schwardt, Chemical Abstracts, vol. 43, pages 6776 and 6777 (Sept. 10, 1949).

U. S. Dispensatory, 24th ed. (1947), page 1562.